Fig. 1.

July 4, 1933.  A. HERZ  1,916,616

ELECTRIC SWITCHING DEVICE

Filed May 5, 1930  3 Sheets-Sheet 3

Inventor
Alfred Herz

Patented July 4, 1933

1,916,616

UNITED STATES PATENT OFFICE

ALFRED HERZ, OF CHICAGO, ILLINOIS, ASSIGNOR OF ONE-HALF TO EDMUND O. SCHWEITZER, OF CHICAGO, ILLINOIS

ELECTRIC SWITCHING DEVICE

Application filed May 5, 1930. Serial No. 449,762.

This invention relates, generally stated, to electric switches, and is particularly concerned with a novel switch of the type usually referred to as a fused cut-out.

A device of this kind is employed for protective purposes in an electric circuit and comprises, in one embodiment, a fusible link immersed in insulating liquid in a closed container, having provisions for connecting electric conductors to the fusible link. The link fuses under overload in the circuit, disrupts the circuit and thus prevents damage and detriment to the equipment and to the apparatus operating in the circuit.

It is the purpose of this invention to provide a new and improved device of this character, particularly for subway construction, and to incorporate therein numerous novel structural and functional features.

Suitable stationary contacts are provided on the inside of the base coaxial with each of the tubular conduits depending from the base. The cables are attached individually to the conduits, the conductor of each cable extending into the corresponding conduit, and joined therein with the stationary contact by means of a novel sleeve arrangement which is adjustable from the inside of the container by means of a movable rod extending thru each of the stationary contacts into the corresponding conduit and into the sleeve arrangement holding the conductor.

The various objects and features are particularly noted in the following statements of objects:

One object of the invention is concerned with the provision of a fused cut-out, having a container comprising a base housing member provided with tubular conduits for receiving cables individually and for enclosing the conductors thereof, together with flange provisions integral with the container for mounting the device.

Still another object has to do with provisions for locating and for attaching stationary contacts securely within the container and at the base thereof but in insulated relation therefrom and coaxial with the tubular conduits depending from the base housing.

A further object resides in the provision of a mechanical connection for establishing secure conductive relation between the stationary contacts disposed at the base and the conductors within said conduits, respectively.

Another object is concerned with novel provisions disposed coaxial to and within each of said conduits for adjusting the mechanical connection between the corresponding stationary contact and the cable conductor within each conduit.

Still another object relates to provisions for inserting a suitable insulating substance into the interior of each of the tubular conduits, each enclosing a cable conductor and an adjustable joint maintaining the connection between the conductor and the corresponding stationary contact at the base of the housing.

A further object has to do with the provision of a substantially bell shaped closure for attachment to the base housing, providing an annular space between the outside surface of the circumferential wall and the inside surface of said closure, the closure being secured to the base by means of a rim or flange registering with a corresponding lateral rim on said base and, in one embodiment, by means of shaft bolts extending from the flange parallel to the outside surface of the bell shaped closure, together with dowel means for preventing radial displacement of the closure relative to the base housing.

Another object resides in providing a fuse link unit assembly including a fusible member disposed between compression blocks and novel flexible self aligning contact provisions projecting from said compression blocks for establishing connection with the stationary contacts at the base when the device is assembled for operation with the bell shaped closure attached to the base.

A further object is concerned with the provision of a novel cradle device within the bell shaped closure and attached to the bottom thereof, for removably receiving and for holding the fuse link unit assembly in self aligning relation relative to the stationary contacts, whereby this unit can be attached to the cradle securely but movable thereon and detachable therefrom, so that the flexible self aligning contacts can be brought into engagement with the stationary contacts at the base and withdrawn when the bell shaped closure is attached to or withdrawn from the base housing.

Still another object relates to pilot provisions combined with the stationary contacts and adapted to cooperate with the compression block facing the contacts in assembly, for guiding the fuse link assembly unit, which is movably attached within the closure, accurately into position when the closure is attached to the base housing.

Other objects, not specifically noted above, will appear as the description progresses.

The invention will now be described with reference to the accompanying three sheets of drawings, which show one embodiment in various views, and modifications of details so that others may be able to apply the invention to practical use. In the drawings.

All parts are designated in the various drawings by like reference numerals which are primed in the figures showing modifications of details, in order to facilitate the description and the understanding of the invention.

Figure 1:
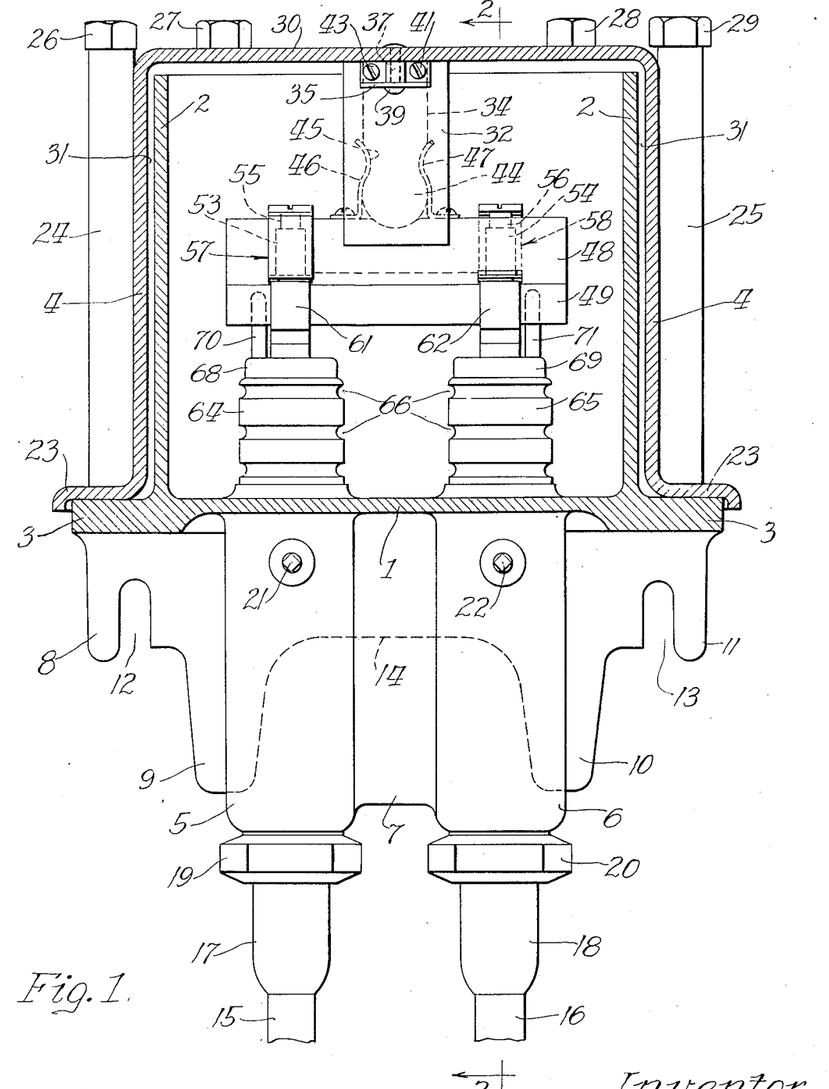
Figure 1 represents a front view of one embodiment of the switch with the container housing and the closure in cross section to illustrate the mechanism disposed within the interior.

Referring now particularly to Figure 1, numeral 1 designates the base of the housing of the switch. This base is provided with a vertically rising circumferential enclosing wall 2, which defines the radial limits of the container, and with a lateral flange 3, provided for attaching the bell shaped closure 4 to the base of the housing. Depending from the base 1 are tubular conduits 5 and 6, joined by an integral intermediate rib 7. A lateral flange, extending parallel to the tubular conduits is provided for suitably mounting the assembled device. This lateral flange has extensions 8, 9, 10 and 11, forming two slots 12 and 13 and a recess 14. The slots 12 and 13 are provided for receiving suitable bolts for the purpose of attaching and fastening the device in place. The recess 14 formed by the extensions 9 and 10 is provided for the purpose of equalizing irregularities which may exist in the masonry or support structure to which the device is to be attached.

Cables 15 and 16 are suitably attached to the tubular conduits 5 and 6, respectively, by means of wiping sleeves 17 and 18 and nuts 19 and 20. It will be understood, of course, that any other suitable manner of attaching the cables may be employed in place of the manner shown in the drawings and described above.

Each conduit encloses a cable conductor and an adjustable contact joint as will be explained presently, and is provided with a removable plug, such as 21 and 22, for inserting fluid insulating substance into the interior.

The bell shaped closure 4 is provided with an overlapping flange 23 having suitable circularly disposed openings for attaching the closure to the base flange 3. In this embodiment, the attachment is by means of elongated shaft bolts, such as indicated at 24 and 25, which extend through the circularly disposed holes in the flange 23 and are threaded into the flange 3. The hexagonal heads 26, 27, 28 and 29 of these elongated shaft bolts are in line with the top 30 of the bell shaped closure, and may be conveniently operated from the top of the device with an ordinary wrench without forcing the operator to the inconvenience of entering the location of the switch down to the flange 23, and applying special tools which otherwise would be necessary.

Figure 9:
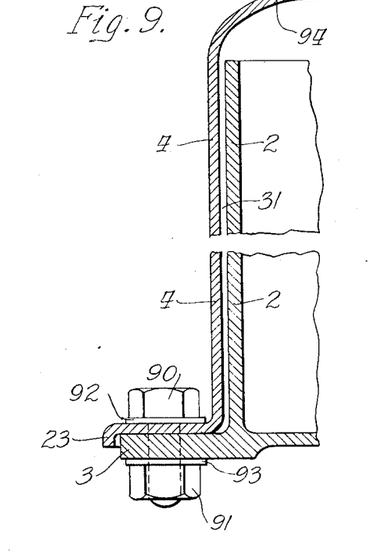
Figure 9 illustrates a partial cross section of the assembled container housings, the closure having a slightly different shape and the attachment being made by means of ordinary bolts and nuts.

It will be understood, however, that the attachment of the closure to the base may be made by means of bolts such as 90 and nuts 91, with suitable washers 92 and 93, as is particularly shown in Figure 9. This figure also shows a closure which is shaped slightly different, its bottom edge being preferably drawn over a larger radius as indicated by numeral 94.

The inside diameter of the bell shaped closure is slightly larger than the outside diameter of the enclosing wall 2 of the base housing, and an annular space 31 is thus provided between the outer surface of the wall 2 and the inside of the closure 4 as shown in the drawings. This annular space acts in the manner of a diving bell, as is described in detail in my Patent No. 1,853,209, issued April 12, 1932, on an application filed August 10, 1925, and prevents the ingress of moisture into the interior of the container.

Figures 2, 3, 4, 5:
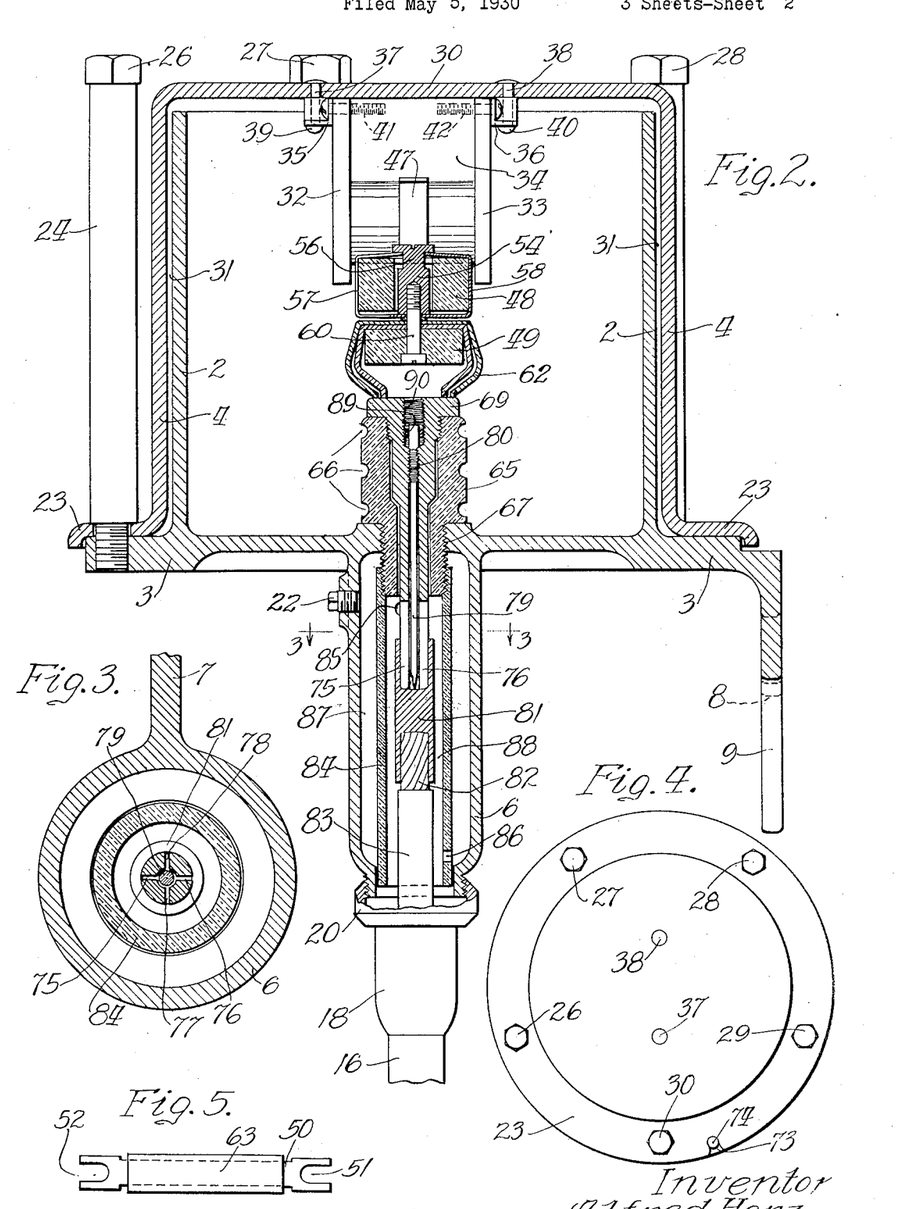
Figure 2 shows a side view in cross section taken on line 2—2 of Figure 1.
Figure 3 illustrates a transversal cross section of the tubular conduit taken on line 3—3 of Figure 2.
Figure 4 represents a top view of the assembly, with certain parts omitted for the sake of clarity.
Figure 5 shows the fusible link disposed within the compression blocks.

Referring now to Figures 1 and 2, it will be seen that angular brackets 35 and 36 are attached to the inner side of the top 30 of the bell shaped closure by means of rivets 37 and 38 headed at 39 and 40. These brackets may, of course, be bolted in place. The brackets are disposed in spaced relation as is shown particularly in Figure 2, and attached thereto are two cradle members 32 and 33 holding an insulating block 34, the attachment to the brackets 35 and 36 being made by means of screws such as 41, 42 and 43 as shown in the drawings. The lower part 44 of the insulating block 34 is rounded, forming lateral recesses 45 for holding the fuse link assembly by means of flexible clips 46 and 47.

The details of the fuse link assembly will be described presently. However, it will be well to mention at this point that this assembly forms a unit including the flexible contacts 61 and 62, and is attached to the inner side of the top of the bell shaped closure by means of the flexible clips 46 and 47 which engage the block 34. Therefore, when the closure is removed from the base housing, the fuse link assembly unit will also be removed since it is held firmly on the block 34. It may then be removed from attachment with the block 34 by simply lifting it off. The re-attachment is equally simple.

It will also be seen that the fuse block assembly, when attached to the cradle by means of the clips 46 and 47 can establish evenly distributed contact between the flexible contacts 61—62, attached to the assembly, and the stationary contacts, since the clips permit a slight rocking motion of the assembly on the rounded head of the block 34. This will be readily understood by examining Figure 1.

Figure 6:
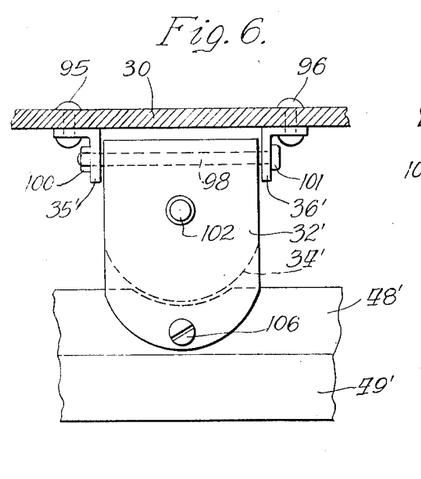
Figure 6 is a front view of a modification of the cradle device for holding the fuse link assembly the compression blocks being indicated fragmentarily in a position analogous to their position shown in Figure 1.
Figure 7:
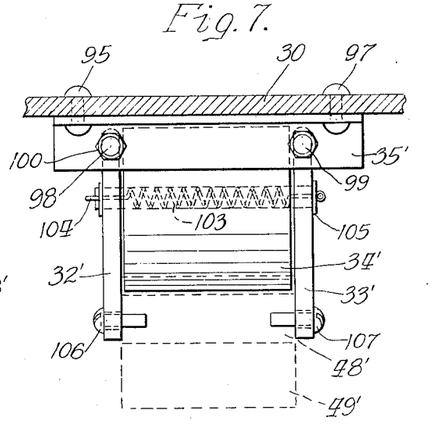
Figure 7 represents a side view of the modified cradle device of Figure 6.

In Figures 6 and 7 is shown a modified form of the cradle, comprising brackets 35' and 36' which are suitably fastened to the bottom 30 of the closure by means of rivets or screws such as 95, 96 and 97. Mounted between those brackets is an insulating block 34' having a rounded face. Two cradle members 32' and 33' are movably disposed in these brackets, pivoted therein on the pivot pins 98 and 99, each of the pivot pins having a head such as 101 and being fastened by means of a nut such as 100. An opening 102 is provided in each of the cradle members 32' and 33', and a corresponding opening is provided in the block 34'. A tensile spring 103 extends thru these openings, its ends being suitably fastened to the cradle members 32' and 33' as indicated at 104 and 105. The spring tends to pull the movable cradle members laterally toward the block 34'.

Pivot screws 106 and 107 are attached to the cradle members 32' and 33' as shown, their shafts extending into the interior of the cradle. The compression block 48' of the fuse link assembly is provided with two lateral pivot openings for engaging the shafts of the pivot screws 106 and 107.

The fuse link assembly is attached to the cradle by spreading the cradle members 32' and 33' laterally against the force of the spring 103 and by inserting the compression block 48' until the shafts of the pivot screws engage the openings in the compression block. The cradle members will hold the fuse link assembly due to the action of the spring 103, and the assembly will be free to adjust itself when the closure is attached to the base and when the flexible contacts 61 and 62 engage the stationary contacts 68 and 69 since the fuse link assembly can rock on the rounded head of the block 34' as on a saddle. This self aligning feature permits even contact to be made between the flexible contacts and the stationary contacts.

Continuing now the description of details of the fuse link assembly as shown in Figures 1 and 2, this assembly is a unit and comprises two compression blocks 48 and 49 which are made of insulating material. The fuse which is shown in detail in Figure 5, comprises a body having slots 51 and 52 for convenient attachment within the compression blocks. Each of the threaded studs 53 and 54 which extend through suitable openings in the compression block 48 and which are provided with recessed portions 55 and 56, holds a conductive member 57 and 58, which exerts a slight spring tension tending to move the studs from the compression block 48. The structure of the fuse and of its attachment by means of the recessed threaded studs is particularly described in the copending application Serial No. 49,189, filed August 10, 1925, now issued as Patent No. 1,853,209, above referred to, which may be consulted for details not mentioned herein. The companion compression block 49 is provided with holes for receiving screws, such as at 60, adapted to engage the threaded studs 53 and 54, respectively. The screws are countersunk in the compression block 49 as is shown in Figure 2. Inserted between the compression blocks in register with the members 57 and 58 are flexible contact members 61 and 62.

I contemplate using herein the form of fuse blocks shown in United States Letters Patent No. 1,479,558, issued January 1, 1924 to Edmund O. Schweitzer and myself, with the portion or portions of contracted section of the fuse exposed to oil and outside the actual damping surfaces or otherwise exposed to the oil within the container.

Figure 8:
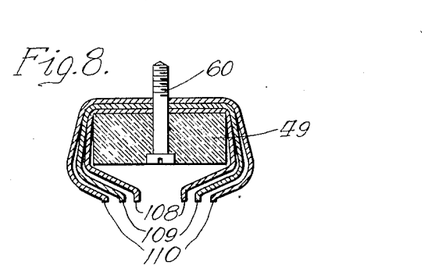
Figure 8 shows a modification of the flexible contacts in cross section.

The flexible contacts comprise substantially G shaped conductive leaves spreading apart toward the tips as shown in order to achieve reliable and self aligning contact when the flexible contacts engage the stationary contacts. This may be particularly seen in Figure 8 showing the cross section of a flexible contact comprising three leaves. The leaves spread apart toward the tips 108, 109 and 110. The tip of each of these leaves will establish contact with the stationary contacts, such as 69, and will thereby maintain a very reliably large contacting area. Without the provision of spreading leaf contacts as shown, tipping of a solid contact would necessarily locate the contact on edge relative to the stationary contact. This is avoided since the tip of each leaf will establish connection individually, contributing to a reliable operation. This spread-leaf contact disclosed herein, is therefore, individually self-aligning, and, as will be remembered, the fuse link assembly as such, holding these self-aligning flexible contacts in self-aligning as a unit and removably attached to the bottom and the closure.

When the various parts of the fuse link unit are located in place relative to each other as explained above, and assembled by means of the screws such as at 60 which are inserted and tightened in the studs 53 and 54, the fuse shown in Figure 5 will be held in place firmly between the compression blocks, and the resulting assembly will form a unit in itself, including the fuse, the compression blocks, and the yieldable self aligning contact members 61 and 62.

The flexible clips 46 and 47 are then attached to the compression block 48, in case of the embodiment as shown in Figures 1 and 2, completing the fuse assembly unit and adapting the same for removable self aligning attachment to the insulating block 34 which is firmly held in the cradle on the inner side of the top of the bell shaped closure. In case of the embodiment shown in Figures 6 and 7, the fuse link unit is attached to the inner side of the top of the closure as described previously, by spreading the cradle members 32' and 33' apart and pivoting the compression block 48' on the shafts of the pivot screws 106 and 107.

The active portion of the fuse is covered with a sleeve 63, preferably of sheet asbestos, for holding the fuse metal and for preventing the arc of successive fuses following through the metal of a preceding fuse. No fuse metal will therefore precipitate on the surfaces of the compression blocks. It will be removed with the removal of a blown fuse.

Insulating bushings 64 and 65, having circular recesses 66 and each provided with a threaded portion 67 are attached to the base of the housing each coaxial with the corresponding tubular conduit depending from the base. The circular recesses on these bushings serve the purpose of reducing and inhibiting creepage. Tubular contact members 68 and 69 are attached to the insulating bushings, respectively. They represent the stationary contacts in the assembly. The yieldable self aligning contacts 61 and 62 of the fuse link assembly unit maintain operating engagement with these stationary contacts when the closure is attached to the base housing as shown in the drawings.

Each of the stationary tubular contact members is provided with a pilot member 70 and 71, respectively, adapted to engage corresponding openings in the compression block 49 for guiding the fuse link assembly into position when the bell shaped closure, holding the self aligning fuse link assembly, is attached to the base.

It may be mentioned at this point, with reference to Figure 4, that the rim 23 of the closure is provided with a slot 73, and the rim 3 with a dowel pin 74 adapted to engage the slot 73 when the closure is attached to the base, to prevent radial displacement of the closure relative to the base.

Figure 10:
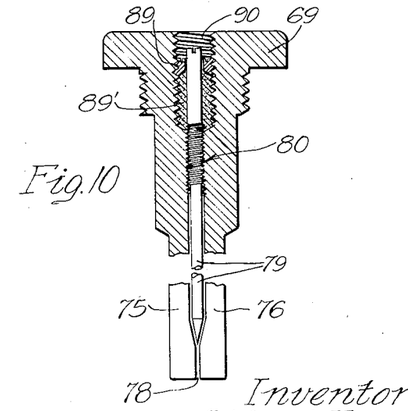
Figure 10 shows the stationary contact in cross-section on an enlarged scale, illustrating the adjusting means disposed therein.

Returning now again to the description of the stationary contacts 68 and 69, it will be seen from Figure 2, and particularly from Figure 10, that each of these contacts is tubular, having an elongated shaft body extending down into the corresponding conduit. The end of the shaft of the body of each of these contacts is split as shown in Figures 2, 3 and 10, Figure 3 being a transversal cross section on line 3—3 of Figure 2 and Figure 10 being an enlarged cross-sectional view of the contact. The resulting slots 75, 76, 77 and 78 permit radial spreading of the contact shaft body within the conduit. A rod 79 having a pointed tip may be threaded into the contact member as indicated by numeral 80 in Figure 2 and Figure 10, advancing the rod toward the end of the elongated split shaft of the contact body, where the tip of the rod is adapted to engage the four wings of the split shaft of the tubular contact and to spread them laterally into engagement with the sleeve member 81. This sleeve member is of conductive material and engages the conductor 82 of the cable 16 which is attached to the conduit as previously explained. The insulation 83 is removed from the end of the cable conductor and the sleeve 81 is attached thereto as shown. The upper end of the rod 79 may be provided with a slot for inserting a screw driver to advance the rod to spread the wings of the elongated shaft body as described and as particularly shown in Figure 10, to establish in this manner good and reliable contact with the cable conductor.

A protective tube 84 of insulating material is attached to the threaded portion of the insulating member 65 supporting the stationary contact. This tube is provided with a transversal top opening 85 and with a transversal bottom opening 86, dividing the conduit into two communicating chambers 87 and 88. A plug, such as at 22, is attached to the upper end of each conduit, below the base of the housing, closing a threaded opening located there. This arrangement serves the insertion of insulating compound into the interior of the communicating chambers in the conduit.

As shown particularly in Figure 10, each of the stationary contacts is provided with an internal thread 90 in its upper part, in addition to the thread 80 for attachment of the rod 79. A ring nut 89 is attached in the threaded opening 90 for sealing the opening by means of a suitable packing 89'. This nut may be provided with suitable openings for attaching a key to insert the same in the contact.

An opening may be provided at the base 1 for draining oil from the container, and this opening may be suitably sealed by means of a drain plug.

It will be seen that the structure as described above presents numerous novel and advantageous features over prior constructions. The outstanding novel features consist in the provision of self aligning flexible contacts combined with the fuse link assembly to a unit which is self aligning as such, due to its movable or adjustable and removable attachment to the cradle at the bottom of the closure, and in the various provisions shown and described in connection with the adjustable joints located in the conduits. These various novel features, of course, necessitate a combination in assembly which is novel in itself. It will be understood, of course, that modifications of detail parts and of the entire assembly may suggest themselves in the light of the present disclosure without introducing novelty and without altering the spirit and the scope of the invention. It is to be understood therefore, that it is not intended to use the invention precisely as described and explained in this specification, but that its use is contemplated within the scope and within the meaning of the following claims which define what is believed new in the art. What is claimed is:

1. A switching device, comprising a substantially cup shaped container, stationary contacts disposed permanently in said container at the base thereof, a removable substantially bell shaped closure for attachment to said container, and yieldable self aligning contacts removably disposed within said closure for engagement with said stationary contacts when said closure is attached to said container.

2. A switching device, comprising a substantially cup shaped container, stationary contacts disposed in said container at the base thereof, current conductors attached to said container and connected to said stationary contacts, a removable substantially bell shaped closure for attachment to said container, and a fuse link assembly comprising compression blocks and yieldable contacts removably disposed within said closure for closing the circuit of said conductors over said stationary contacts and said yieldable contacts when said closure is attached to said container.

3. A switching device, comprising a substantially cup shaped container, stationary contacts disposed in said container at the base thereof, current conductors attached to said container and connected to said stationary contacts, a removable substantially bell shaped closure for attachment to said container, a fuse link assembly comprising a fusible member disposed within compression blocks and carrying yieldable self aligning contact members, and means for movably and removably attaching said fuse link assembly to the base of said closure for establishing connection between said yieldable contacts and said stationary contacts when said closure is attached to said container.

4. A switching device, comprising a container, stationary contacts disposed in said container, a closure for attachment to said container, a fuse link assembly including a fusible member, compression blocks and yieldable self aligning contacts, means for movably attaching said assembly to said closure to obtain connection between said yieldable and said stationary contacts when said closure is attached to said container, and pilot means associated with said stationary contacts for guiding said assembly to establish said connection.

5. A switching device, comprising a container, stationary contacts disposed within said container, a closure for attachment to said container, a fuse link assembly including a fusible member and yieldable contacts, means for removably associating said assembly with said closure, and pilot means associated with said stationary contacts for guiding said assembly to establish connection between said yieldable contacts and said stationary contacts when said closure is attached to said container.

6. A switching device, comprising a container, stationary contacts disposed within said container, a closure for attachment to said container, a fuse link assembly including a fusible member and yieldable contacts, means in said closure for movably holding said assembly, means on said assembly for removable attachment to said first means, and means associated with said stationary contacts and cooperating with said assembly for guiding said assembly to establish connection between said yieldable contacts and said stationary contacts when said closure is attached to said container.

7. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means disposed within said closure and removable therewith including yieldable contacts for engagement with said stationary contacts when said closure is attached to said container, and means cooperating with said base flange and with said mouth flange for fastening said closure to said container.

8. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means disposed within said closure and removable therewith including yieldable contacts for engagement with said stationary contacts when said closure is attached to said container, dowel means for holding said closure against radial displacement relative to said container, and means for fastening said closure to said container to prevent axial displacement therebetween.

9. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means disposed within said closure and removable therewith including yieldable self aligning contacts for engagement with said stationary contacts when said closure is attached to said container, and shaft bolts extending peripherally parallel to the outer surface of said closure for attaching said closure to said container by means of said registering flanges.

10. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means disposed within said closure and removable therewith including yieldable self aligning contacts for engagement with said stationary contacts when said closure is attached to said container, means cooperating with said flanges for attaching said closure to said container, and means integral with said base flange for mounting said container.

11. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, movable switching means disposed within said closure and removable therewith including yieldable self aligning contacts for engagement with said stationary contacts when said closure is attached to said container, means cooperating with said flanges for attaching said closure to said container, and means integral with said base flange and disposed angular thereto for mounting said device.

12. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means movably disposed within said closure and removable therewith including contacts for engagement with said stationary contacts when said closure is attached to said container, means cooperating with said flanges for attaching said closure to said container, a mounting flange integral with said base flange and disposed angular thereto for mounting said device, conduit means integral with the base of said container and disposed parallel to said mounting flange for receiving current conductors terminating in said device, and cable means attached to said conduit means and connected to said stationary contacts, said conduit means being disposed with respect to said mounting flange so as not to interfere with the mounting of the container by means of said flange and so that the said mounting flange will not interfere with attachment of said cable to said conduit means.

13. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means movably disposed within said closure and removable therewith including yieldable self aligning contacts for engagement with said stationary contacts when said closure is attached to said container, means cooperating with said flanges for attaching said closure to said container, a mounting flange integral with said container and disposed parallel thereto but in right angle to the base thereof, and tubular conduit means disposed parallel to said mounting flange for receiving current conductors terminating in said device, said conduit means being disposed with respect to said mounting flange so as not to interfere with the mounting of the container by means of said flange and so that said mounting flange will not interfere with application of said current conductors to said conduit means.

14. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means disposed within said closure and removable therewith including contacts for engagement with said stationary contacts when said closure is attached to said container, means cooperating with said flanges for attaching said closure to said container, a mounting flange integral with said container and disposed parallel thereto but in right angle to the base thereof, a plurality of tubular conduits integral with said container and disposed parallel to said mounting flange for receiving current conductors terminating in said device, and means in each of said conduits for inserting fluid insulating substance into said conduits.

15. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means movably disposed within said closure and removable therewith including yieldable self aligning contacts for engagement with said stationary contacts when said closure is attached to said container, means cooperating with said flanges for attaching said closure to said container, a flange disposed parallel to said container for mounting said device, a plurality of tubular conduits disposed parallel to said mounting flange for receiving current conductors terminating in said device, and adjustable means in each of said conduits for joining the conductor therein with one of said stationary contacts within said container.

16. An oil containing electric switching device, comprising a substantially cup shaped container having a radially extending base flange, stationary contacts disposed within said container at the base thereof, a substantially bell shaped closure for attachment to said container having a radially extending mouth flange to register with said base flange, switching means movably disposed within said closure and removable therewith including yieldable contacts for engagement with said stationary contacts when said closure is attached to said container, means cooperating with said flanges for attaching said closure to said container, a flange disposed parallel to said container for mounting said device, tubular conduits disposed parallel to said mounting flange for receiving current conductors terminating in said device, means in each of said conduits for adjustably joining the conductor therein with one of said stationary contacts within said container, and means in each of said conduits for inserting fluid insulating substance therein.

17. An oil containing electric switch, having a housing comprising a base member and a detachable closure therefor, stationary contacts disposed in said base member, switching means removably disposed within said closure and detachable therewith, said switching means contacting with said stationary contacts when said closure is attached to said base member, tubular conduits depending from said base member for receiving and for holding cables terminating in said switch, and adjustable means within each of said conduits for establishing connection between a conductor of the corresponding cable and a stationary contact in said base member.

18. An oil containing electric switch, having a housing comprising a base member and a detachable closure therefor, stationary contacts disposed in said base member, movable switching means removably disposed within said closure and detachable therewith, said switching means contacting with said stationary contacts when said closure is attached to said base member, tubular conduits depending from said base member for receiving and for holding cables terminating in said switch, and means within each of said conduits and adjustable from the interior of said housing for establishing connection between a conductor of the corresponding cable and a stationary contact in said base member.

19. An oil containing electric switch, having a housing comprising a vertically mounted substantially cup shaped base member and a detachable substantially bell shaped closure therefor, stationary switching means disposed in said base member, movable switching means removably disposed within said closure and contacting with said first switching means when said closure is attached to said base member, a tubular conduit associated with said base member for receiving a conductor in insulated relation, adjustable means operable from the interior of said base member for joining said conductor with a stationary switching means in said base member, and means in said conduit for inserting fluid insulating substance into said conduit.

20. In an electric switch, a base, a tubular conduit extending from said base for receiving a cable and for enclosing a conductor of said cable, a tubular contact member, means on said base for mounting said contact member coaxial with said conduit in insulated relation therefrom, and means adjustable from said base for establishing conductive relation between said contact member and said conductor within said conduit.

21. In an electric switch, a base, a tubular conduit extending from said base for receiving and for holding an electric conductor in insulated relation, a tubular contact member, means on said base for mounting said contact member in said conduit in insulated relation thereto, a tubular sleeve member engaging said conductor and said contact member within said conduit, and movable means operable from said base for forcing the end of said contact member radially into engagement with said sleeve member.

22. In an electric switch, a base, a tubular conduit extending from said base for receiving and for holding an electric conductor in insulated relation, a tubular contact member, means on said base for mounting said contact member in said conduit in insulated relation thereto, a tubular sleeve member engaging said conductor and said contact member within said conduit, movable means extending through said contact member and operable from said base for forcing the end of said contact member radially into engagement with said sleeve member, and tubular insulating means within said conduit for enclosing said contact member, said sleeve member, and said conductor disposed within said conduit.

23. In an electric switch, a base, a tubular conduit extending from said base for receiving and for holding an electric conductor in insulated relation, a tubular contact member, means on said base for mounting said contact member in said conduit in insulated relation therefrom, a tubular sleeve member engaging said conductor and said contact member within said conduit, movable means extending through said contact member and operable from said base for forcing the end of said contact member radially into engagement with said sleeve member, and a tube surrounding the contact engaging sleeve and disposed within the tubular conduit, said tube having means placing the interior of the tube in communication with the interior of the tubular conduit for entry into the tube of insulating substance introduced into the conduit.

24. In an electric switch, a base, a tubular conduit extending from said base for receiving and for holding an electric conductor in insulated relation, a tubular contact member, means on said base for mounting said contact member in said conduit in insulated relation therefrom, a tubular sleeve member engaging said conductor and said contact member within said conduit, movable means extending through said contact member and operable from said base for forcing the end of said contact member radially into engagement with said sleeve member, tubular insulating means disposed within said conduit for enclosing said contact member, said sleeve member, and said conductor within said conduit, and means in said conduit and in said insulating means for admitting fluid or semi fluid insulating substance into the interior of said conduit and into said tubular insulating means.

25. In an electric switch, a base, a tubular conduit extending from said base for receiving and for holding an electric conductor in insulated relation, a tubular contact member, means on said base for mounting said contact member in said conduit in insulated relation therefrom, a tubular sleeve member engaging said conductor and said contact member within said conduit, movable means extending through said contact member and operable from said base for forcing the end of said contact member radially into engagement with said sleeve member, tubular insulating means for enclosing said contact member, said sleeve member, and said conductor within said conduit and for dividing the interior of said conduit into an outer chamber and an inner chamber, an opening in said insulating means provided for fluid communication between said chambers, an opening in said conduit for inserting fluid insulating liquid into said chambers, and means for closing said opening in said conduit.

26. In an electric switching device, a vertically disposed switch housing having a horizontally disposed base, a tubular conduit depending from said base for receiving a cable and for enclosing a conductor of said cable, an elongated tubular contact member having a slotted end, means in said base within said housing for mounting said contact member coaxial with and extending into said conduit in insulated relation thereto, a conductive sleeve member joining said slotted end of said contact member and said conductor, and means operable from said housing for forcing said slotted end radially into engagement with said sleeve member.

27. In an oil containing electric switch having a closed container comprising a first and a second telescoping detachably joined housing, conduit means on said first housing for connecting conductors thereto, stationary contacts in said first housing, adjustable means for establishing connection between said conductors and said stationary contacts, switching means including yieldable contacts for establishing connection with said stationary contacts, and means for movably securing said switching means to said second housing.

28. A switching unit for an electric switching device, comprising a fusible link, compression blocks for holding said link, and a plurality of yieldable contacts conductively connecting said link and projecting from said compression blocks, each of said contacts comprising a plurality of individual substantially G-shaped yieldable contact leaves securely joined at the base and flaring apart at the tips.

29. In an electric switching device, a container having a plurality of stationary contacts, conductors, adjustable means for joining said conductors with said stationary contacts, a cover for said container, a switching unit including a plurality of yieldable contacts each comprising a plurality of substantially G-shaped leaves secured at the base and flaring apart at the tip for individual self aligning engagement with said stationary contacts, and means for movably and detachably securing said unit within said cover.

30. In an electric switching device, a substantially cup-shaped container for receiving and holding a body of insulating oil, a substantially cup-shaped cover attached to said container in inverted position annularly spaced therefrom and providing pressure within the container for preventing ingress of moisture into the interior of said container, contacts in the container, conductor means led in through the container and connected to said contacts, a fuse link assembly carried by the cover and removable from the container with the removal of the cover and including a fuse and a pair of compression blocks, one on each side of the fuse, said fuse and compression blocks being enclosed by the body of oil when the cover is in place on the container.

31. In an electric switching device, a container closed at the bottom and adapted for receiving and for holding a body of insulating oil, a cover for said container, contacts disposed within the container and mounted upon the closed bottom thereof, conductor means led in through the bottom of the container and connected to said contacts, a fuse link assembly adapted for bridging relation across said contacts when the cover is in place upon the container, said fuse link assembly being carried by the cover and removable from the container with the removal of the cover and including a fuse and a pair of compression blocks, one on each side of the fuse, said fuse and compression blocks being enclosed by the body of oil when the cover is in place on the container.

32. In an electric switching device, a container for receiving and holding a body of oil, a cover for said container, a pair of contacts within the container, and a fuse link assembly adapted for bridging relation across said contacts when the cover is in place upon the container, said fuse link assembly being carried by the cover for removal from the container with the removal of the cover and comprising a pair of compression blocks tiltably suspended from the cover with a fuse disposed between said blocks and having contacts for engagement with said first contacts.

33. In an electric switching device, a container for receiving and holding a body of oil, a cover for said container, a pair of contacts within the container, and a fuse link assembly adapted for bridging relation across said contacts when the cover is in place upon the container, said fuse link assembly being carried by the cover for removal from the container with the removal of the cover and comprising a pair of compression blocks tiltably suspended from the cover with a fuse disposed between said blocks and having contacts for engagement with said first contacts, said last contacts comprising contact leaves looped about one of said compression blocks and secured between said blocks with the free ends of said leaves arranged for engagement with said first contacts.

In witness whereof, I hereunto subscribe my name this 28th day of April, 1930.

ALFRED HERZ.